United States Patent Office 2,963,419

Patented Dec. 6, 1960

1

2,963,419

REGENERATION OF A MOLYBDENUM OXIDE CONTAINING CATALYST EMPLOYED IN THE HYDROGENATION OF LUBRICATING OILS

LeRoy W. Holm and Hillis O. Folkins, Crystal Lake, Ill., assignors to The Pure Oil Company, Chicago, Ill., a corporation of Ohio No Drawing. Filed Dec. 18, 1956, Ser. No. 629,195

6 Claims. (Cl. 208—144)

This invention relates to a method of restoring the activity of molybdenum oxide-containing catalysts for chemical reactions and, more particularly, to a process or sequence of steps for regenerating molybdenum oxide-containing catalysts to be used in hydrogenation reactions.

The art of conducting catalytic reactions involving hydrogenation, dehydrogenation, isomerization, cracking, polymerization, alkylation, desulfurization, hydrofining and many other reactions has developed to the point where each catalytic process or each broad type of catalyst apparently has its own particular problems of catalyst reactivation or pretreatment in relation to maintaining the highest sustained conversion, the least catalyst destruction, and the highest yields. In many of these processes, the catalyst mass becomes gradually inactivated by the formation of coke-like deposits or complexes, reduction of a necessary metallic oxide, sintering, etc., necessitating some form of rejuvenation, coke removal, metal oxidation, or reduction before the catalyst mass can be re-used.

The regeneration or reactivation of a catalyst which has lost activity due to the deposition of coke or other catalyst deposits most generally consists of burning off these substances with air in the presence of an inert, diluent gas at elevated temperatures. The conditions used for this purpose are generally designed to give the maximum amount of reactivation with the least heating and a minimum residence time in the regenerator. Such regenerations are conducted using fixed-bed, moving-bed, or fluid-bed techniques. Precautions must be taken to prevent overheating of the catalyst with resulting sintering and fusion thereof. Molybdenum oxide-containing catalysts are particularly difficult to regenerate because of their tendency to fuse or change into a semi-crystalline form deleterious to the catalytic activity. In order to carry away the heat of regeneration, the use of steam as a diluent has been used for some types of catalysts. Steam for many reasons has a considerable economic advantage over the use of dry inert gases such as nitrogen, flue gas, etc., because of its availability, ease of handling and low cost. However, steam in some instances has a deleterious effect on the catalyst, particularly molybdenum oxide-containing catalysts, which prevents its wide-spread use. Molybdenum oxide-alumina and molybdenum oxide-alumina-silica catalysts are examples of catalysts which show a marked decrease in activity when regenerated in the presence of steam or exposed to moisture when the regeneration is carried out in accordance with conventional procedures.

In accordance with this invention, it has been found that the deleterious effects of steam, when used as a diluent gas during the regeneration of these types of catalysts, can be overcome and a low-cost regeneration procedure attained if a specific regeneration procedure is followed. The present invention is directed to a regeneration technique for molybdenum oxide-containing catalysts wherein the regeneration of the catalyst in the presence of steam and air is followed, after appropriate purging to remove the oxidizing atmosphere, by treatment of the catalyst with a substantially anhydrous medium which may be inert, non-oxidizing or reducing, such as hydrogen, nitrogen, or air, at temperatures above about 750° F. but below about 1200° F. This step, when combined with the ordinary regeneration steps, removes substantially all of the deleterious moisture present. Furthermore, it has been found that the temperature of the purging step with the substantially anhydrous medium is critical and must be maintained within the limits of about 750° to 1200° F. Although the invention is not to be limited or construed in accordance with any theories advanced herein, it is believed that within a short range of temperature above about 700° F., any water present combines with the molybdenum oxide to give a hydrate of the formula $MoO_2(OH)_2$ or $MoO_3.H_2O$. This hydrated form of molybdenum oxide is not of as high catalytic activity as the substantially anhydrous dioxide or trioxide. It is further theorized that by purging the catalyst after regeneration with a substantially anhydrous medium such as a dry gas at temperatures of 750° to 1200° F., there is accomplished a removal of combined water, leaving the molybdenum as dioxide or trioxide forms with the highest catalyst activity.

It has been observed that in conventional regeneration of deactivated catalyst with steam and air, the temperature of the catalyst bed is first raised to about 900° to 1000° F. by the use of preheated steam. Following this, preheated air is introduced along with the steam to burn off the coke and other activity-lowering materials. During this operation the amounts of air and steam are carefully controlled to maintain the burning temperatures at about 900° to 1150° F. Upon completion of the burning operation, the catalyst bed is generally cooled with additional steam until the temperature has been lowered to the operating temperature of the reaction for which the catalyst is to be used. As will be demonstrated in the following detailed explanation of this invention, these methods of regeneration cause a marked decrease in the catalytic activity of molybdenum oxide-containing reactions at temperatures below 700° F. The invention will be seen to provide a method of using steam in the regeneration of these types of catalysts while still regaining the original catalyst activity.

In addition, it has been found that the hydrogenation activity of molybdenum oxide-containing catalysts, particularly at lower temperatures, that is, less than 650° F., is decreased considerably by exposure of the fresh or regenerated catalyst to moisture at temperatures above about 700° F. Further, it has been found that this decrease in catalyst activity is not as appreciable if the exposure to moisture, whether during processing or handling or otherwise, is at temperatures below about 650° In accordance with this invention, it has been found that the catalyst can be regenerated to its original activity, that is, the activity exhibited as freshly prepared or freshly regenerated before exposure to moisture, by purging the catalyst with a substantially anhydrous medium within the critical temperature limitation of 750 to 1200° F. after it has been exposed to moisture at these high temperatures.

The benefits of the regeneration technique of this invention can be briefly summarized. Molybdenum oxide-containng catalysts which have been reactivated in accordance with this invention can be used commercially for hydrogenation reactions at temperatures of about 450° to 650° F. without being adversely affected by exposure to moisture, and under these conditions exhibit catalyst lives which make their use quite economical. The regeneration step may be shortened considerably by cooling the catalyst in accordance with the present invention. Furthermore, if the catalyst becomes deactivated during the course of its use by exposure to moisture at elevated temperatures, it may be reactivated by purging with a substantially anhydrous medium at temperatures above about 750° F. and no higher than about 1200° F. The reactivated catalysts of this invention may be used to treat lubricating oils for the purpose of reducing the neutralization number with no evidence of any substantial decreases in activity over considerable periods of time.

Accordingly, it becomes a primary object of this invention to provide a method of restoring the activity of molybdenum oxide-containing catalysts.

Another object of this invention is to provide a method for regenerating molybdenum oxide-containing catalysts for use in hydrogenation reactions.

A further object of the invention is to provide a method of overcoming the deleterious effect of water upon molybdenum oxide-containing catalysts, especially for use in hydrogenation reactions.

Still a further object of the invention is to provide a combined method of regeneration and cooling of molybdenum oxide containing catalysts wherein the cooling step is conducted under certain prescribed and critical conditions.

Before describing the invention by comparison of known methods of regeneration and the new technique developed herein, a specific method of regeneration which is preferred for commercial application is set forth as follows: a deactivated molybdenum oxide-containing catalyst is first purged with steam to remove entrained charge material from the catalyst bed. Following this, the catalyst bed temperature is raised to about 900° with preheated steam, and then preheated air is introduced along with the steam to burn activity-reducing materials from the catalyst surface at temperatures of about from 900° to 1150° F. Upon completion of the burning operation, the flow of air is terminated and all of the remaining air is purged from the catalyst bed with steam or an inert gas such as nitrogen or a flue gas. Any medium may be used for this purging step which accomplishes the removal of the oxidizing atmosphere to avoid the formation of explosive mixtures in subsequent steps if the substantially anhydrous medium used is a reducing atmosphere. In turn, the steam or other purging atmosphere is then purged from the catalyst with hydrogen introduced in a substantially moisture-free condition. To attain this substantially moisture-free condition, the hydrogen or other medium used may be passed over silica gel, activated alumina, calcium chloride, or other known desiccants. The purging operation with dry hydrogen is continued at about 900° F. for a sufficient period of time to remove all water adsorbed and combined at this temperature, after which the catalyst bed is cooled to the operating temperature while continuing the flow of hydrogen. As an alternative, dry air, nitrogen, or mixtures thereof may be used in place of the water-free hydrogen during the drying step. Alternatively dry, inert gas may be used in admixture with the water-free hydrogen.

The invention is demonstrated by reference to Tables I and II. The data contained there were obtained from the hydrogenation of a medium viscosity lubricating oil distillate identified as "No. 7 Neutral Distillate" in Table IV, which sets forth the physical properties of oils that may be advantageously treated in accordance with the invention. The hydrogenation operation was conducted at constant operating conditions using commercial molybdenum oxide-alumina and molybdenum oxide-alumina-silica catalysts having the compositions shown in the tables. Two hundred cubic centimeters of catalyst were used in each series of runs.

The efficiency of the regeneration technique of the present invention is indicated by the extent of removal of acids from the distillate oil being treated as measured by the (1948) neutralization number method of the end product. The runs shown in the tables represent a continuous operation on the same catalyst and are numbered only to indicate the sequence of treatment to which the catalyst was subjected. Run A of Table I is presented to show that the activity of a catalyst of this type (molybdeum oxide-alumina-silica) which has been regenerated with air but not exposed to moisture, is excellent for the indicated purpose. Run 1, in which a preheated fresh catalyst was used, shows a high activity equivalent to that of the air-regenerated catalyst of Run A. The effect of steam-air regeneration in which, after exposure to steam, the catalyst was purged with a dry gas at specific high temperatures for an insufficient length of time is shown by Runs 2 and 3 in which only partial reactivation of the catalyst was obtained. Run 4 shows that purging the deactivated catalyst with hydrogen at temperatures of about 600° F. is similarly ineffective to reactivate the catalyst to its original activity. The activity of the catalyst was further reduced by exposure to steam at 800° to 900° F., as shown by Run 5. Runs 6 and 7 were conducted in order to substantiate Run 4 and show that purging with hydrogen at about 500° to 600° F. is ineffective in reactivating the catalyst.

Run 8 shows that air-steam regeneration of this deactivated catalyst, followed by purging of the catalyst with nitrogen at temperatures of about 800° to 1000° F. for a sufficient length of time, rejuvenates the catalyst to its original activity. Regeneration with air and steam, followed by cooling to operating temperatures with steam, again resulted in deactivation of the catalyst, as indicated by Run 9. Run 10 shows that this deactivated catalyst, containing both adsorbed and combined water, could be reactivated by purging with hydrogen at 800° F. for a sufficient length of time. When the catalyst was exposed to steam at 550° F., there was no decrease in activity (Run 11). Runs 12 and 13 were check determinations to show the effects of steam and hydrogen purging at temperatures above 750° F.

Table II substantiates for a molybdenum oxide-alumina catalyst what has been shown in Table I for a molybdenum oxide-alumina-silica catalyst. Runs 14 and 15 show the activity of a preheated, fresh molybdenum oxide-alumina catalyst. Run 16 shows the deactivating effect of steam at temperatures above 700° F., and Run 17 shows that this catalyst, so deactivated, could be rejuvenated to about its original activity. The fact that exactly the same activity (as measured by the reduction in neutralization number) shown in Run 15 was not regained during Run 17, was due to normal decrease in activity for this catalyst at these operating conditions. These results show that molybdenum oxide-containing catalysts can be regenerated by the particular prescribed technique shown.

The invention produces particularly beneficial results when the molybdenum oxide-containing catalyst is to be used for hydrogenation reactions which occur below 750° F., including olefin reduction, desulfurization, acid reduction, and other such reactions to which naphthas, petroleum fractions, cracked oils, lubricating oils, fats, and fatty acids are subjected, especially the hydrogenation of lubricating oil stocks at temperatures lower than 650° F. One such reaction is the hydrofining of lubricating oils for the purpose of quality improvement, e.g., reduction of the acid content as measured by the neutralization number. Light, medium, or heavy lubricating oil stocks of the distillate or residual variety may be treated by catalytic hydrogenation, and the catalyst activity and life can be maintained by the regeneration process described herein. Temperatures of from 450° F. to 650° F., pressures from atmospheric to 700 p.s.i.g., preferably from 100–500 p.s.i.g., and liquid volume hourly space velocities of from 0.1–4.0 v./hr./v. may be used in such hydrogenation processes. The reaction may be conducted using fixed bed, moving bed, or fluidized bed techniques, with regeneration being intermittent or continuous.

TABLE I [1]

| Run No. [2] | A | 1 | 2 | 3 | 4 |
|---|---|---|---|---|---|
| Catalyst pretreatment before run | Regenerated in air alone at 1,050° F. to 1,150° F. Cooled to run temperatures with air. | Fresh catalyst preheated in air at 900° F. for 3 hrs. | Regenerated with air and steam at 1,100° F. Cooled to run temperatures with nitrogen. 1½ hrs. above 800° F. after exposure to moisture. | Regenerated with air and steam at 1,100° F. Cooled to run temperatures with nitrogen. 45 mins. above 800° F. after exposure to moisture. | Purged with hydrogen at 550–600° F. for 48 hrs. |
| Temp., ° F | 540–550 | 558 | 552 | 555 | 551. |
| LVHSV, v./v./hr | 0.9 to 1.1 | 1.0 | 1.0 | 1.0 | 1.0. |
| Pressure, p.s.i.g | 250 | 250 | 250 | 250 | 250. |
| Hydrogen rate, s.c.f./hr | 3.5 to 5.0 | 4.2 | 4.5 | 4.2 | 4.0. |
| Length of run, hrs | 147 | 10 | 15 | 17 | 24. |
| Product inspection, 1948 neut. number— | | | | | |
| After 5th hr. of run | <0.03 | <0.03 | 0.06 | 0.05 | 0.05. |
| After 10th hr. of run | <0.03 | <0.03 | 0.10 | 0.28 | 0.07. |
| At end of run | <0.03 | <0.03 | 0.13 | 0.32 | 0.17. |
| Vis., SUS at 210° F | 46.8 | 47.0 | | | 46.8. |
| ° API | 24.4 | 24.1 | | | 24.6. |

| Run No. | 5 | 6 | 7 | 8 | 9 |
|---|---|---|---|---|---|
| Catalyst pretreatment before run | Purged catalyst with steam at 900° F. for 2 hrs. Cooled to run temperatures with steam. | Purged with hydrogen for 5 hrs. at 590° F. | Purged with hydrogen for 120 hrs. at 560° F. | Regenerated with air and steam at 1,100° F. and then purged with nitrogen at 800–950° F. for 3 hrs. Cooled to run temperatures with nitrogen. | Regenerated with air and steam at 1,100° F. and then cooled to run temperatures with steam. |
| Temp., ° F | 559 | 560 | 559 | 562 | 562. |
| LVHSV, v./v./hr | 1.0 | 1.0 | 1.1 | 1.0 | 0.9. |
| Pressure, p.s.i.g | 250 | 250 | 250 | 250 | 250. |
| Hydrogen rate, s.c.f./hr | 4.0 | 4.3 | 4.5 | 4.7 | 4.3. |
| Length of run, hrs | 10 | 26 | 12 | 36 | 22. |
| Product inspection, 1948 neut. number— | | | | | |
| After 5th hr. of run | 1.0 | 0.75 | 0.85 | <0.03 | 0.10. |
| After 10th hr. of run | 1.1 | 0.80 | 0.87 | <0.03 | 0.14. |
| At end of run | 1.1 | 0.84 | 0.88 | <0.03 | 0.13. |
| Vis., SUS at 210° F | 47.0 | | 46.7 | 46.7 | 46.7. |
| ° API | 24.3 | | 24.7 | 24.7 | 24.8. |

| Run No. | 10 | 11 | 12 | 13 |
|---|---|---|---|---|
| Catalyst pretreatment before run | Purged with hydrogen at 800° F. for 8 hrs. Cooled to run temperatures with hydrogen. | Purged with steam at 550° F. for 4 hrs. | Purged with steam at 800° F. for 4 hrs. | Purged with hydrogen at 800° F. for 5 hrs. |
| Temp., ° F | 561 | 559 | 558 | 562. |
| LVHSV, v./v./hr | 1.0 | 1.0 | 0.9 | 0.9. |
| Pressure, p.s.i.g | 250 | 250 | 250 | 250. |
| Hydrogen rate, s.c.f./hr | 4.5 | 4.5 | 4.5 | 4.5. |
| Length of run, hrs | 15 | 21 | 10 | 6. |
| Product inspection, 1948 neut. number— | | | | |
| After 5th hr. of run | <0.03 | <0.03 | 0.14 | <0.03. |
| After 10th hr. of run | <0.03 | <0.03 | 0.21 | |
| At end of run | <0.03 | <0.03 | 0.21 | <0.03. |
| Vis., SUS at 210° F | 46.4 | 46.6 | | |
| ° API | 25.1 | 24.9 | | |

[1] Catalyst: 9% w. molybdenum trioxide, 90% w. alumina and 1% w. silica.
[2] Run Nos. 1 through 13 are consecutive runs on the same catalyst with only the changes specified above. Operation was continuous.

TABLE II [1]

| Run No. [2] | 14 | 15 | 16 | 17 |
|---|---|---|---|---|
| Catalyst pretreatment before run | Fresh catalyst purged with hydrogen at 800° F. for 5 hrs. | None. Continuation of run at higher LVHSV. | Purged catalyst with steam at 850° F. for 5 hrs. | Purged catalyst with hydrogen at 800° F. for 5 hrs. |
| Temp., ° F | 560 | 560 | 560 | 560. |
| LVHSV, v./v./hr | 0.9 | 1.4 | 1.4 | 1.4. |
| Pressure, p.s.i.g | 250 | 250 | 250 | 250. |
| Hydrogen rate, s.c.f./hr | 4.35 | 4.85 | 5.0 | 4.7. |
| Length of run, hrs | 25 | 12 | 6 | 10. |
| Product Inspection, 1948 neut. number— | | | | |
| After 5th hr. of run | <0.03 | 0.23 | 2.0 | 0.35. |
| After 10th hr. of run | <0.03 | 0.23 | | 0.45. |
| At end or run | <0.03 | 0.23 | 2.0 | 0.45. |

[1] Catalyst: 9%w. molybdenum trioxide, 91% w. alumina.
[2] Run Nos. 14 through 17 are consecutive runs on same catalyst. Operation continuous.

The molybdenum oxide-containing catalysts to be treated in accordance with this invention, as applied to the various reactions so far described, may comprise molybdenum oxide supported upon or incorporated with certain high-surface-area, metallic oxide carriers. These supported or composited catalysts may contain from 0.1% to 10%, or as high as 35% by weight, of molybdenum, present as molybdenum dioxide or trioxide, on a porous support material. Catalysts containing from about 2–7 wt. percent of molybdenum are particularly receptive to the present regeneration process. The support may comprise alumina, silica, or combinations of either or both of these with oxides of one or more of the metals selected from the group: magnesium, beryllium, boron, titanium and zirconium. Generally, for hydrogenation use, alumina is present as the major constituent of the support, that is, in an amount of about 75–99.9% by weight, based only on the support composition, and the silica, zirconia, magnesia, or other support constituents are present in minor proportions of about 0.1–25% w. of the support.

In general, the invention may be carried out advantageously by treatment of a deactivated molybdenum oxide-containing catalyst as follows:

(1) Remove entrained charge material, e.g., by purging with inert gas or steam.

(2) Heat to a temperature of about 700° to 1000° F., preferably about 850° to 950° F., e.g., by contact with preheated inert gas or steam.

(3) Introduce a preheated regeneration atmosphere containing oxygen and water vapor at the desired regeneration temperature and under conditions that cause the oxidation of contaminating materials and transformation of the reduced molybdenum to the oxide form, e.g., preheated air and steam, at a temperature of about 800° to 1300° F., and preferably at 900° to 1150° F.

(4) Terminate the oxidation step by removal of the oxidizing atmosphere and purge all remaining moisture from the catalyst body with a dry reducing, oxidizing, or inert atmosphere at 750° to 1200° F. e.g., hydrogen at 800°–900° F.

(5) Allow the catalyst body to cool to room temperature or reaction temperature without contact with moisture at temperatures above about 700° F. before use.

The conditions used in the regeneration step (3) are subject to variation depending upon the state of deactivation of the molybdenum oxide-containing catalysts being treated, the kind and tenaciousness of the deposits thereon, and the cycle of the operation being used. The invention applies to any oxidation regeneration of molybdenum oxide-containing catalysts in the presence of steam where it is desired to prolong the catalyst life. Accordingly, the regeneration step may be carried out at atmospheric or superatmospheric pressures, with the former being preferred. The oxygen content of the regeneration medium may vary considerably and in general should be sufficient to allow completion of the regeneration in a reasonable length of time without danger of sintering of the catalyst. For this purpose, the oxygen content of the regeneration medium may vary from about 0.3 to 5.0 volume percent or higher and preferably maintained at between about 1.0 to 2.0 volume percent. Air many be used to supply the oxygen for the regeneration. The water vapor is introduced along with the oxidizing medium in as large a quantity as is economically feasible without reducing the rate of regeneration and water affording maximum heat dissipation. Steam-air mixtures containing about 98.5 to 75.0 volume percent of steam and 1.5 to 25.0 volume percent of air may be advantageously used to accomplish these results. Preferably, the proportions of steam and air are maintained within the range of about 80.0 to 98.0 volume percent of steam to 20.0 to 2.0 volume percent of air.

In order to further demonstrate the invention, the following Table III shows the results of treating different lubricating oil fractions with hydrogen in the presence of different catalyst compositions and wherein a comparison is made to show the various improvements obtained.

By operating in accordance with the invention, lubricating oil distillates and deasphalted residual oils can be subjected to mild hydrogenation which, in addition to improving the feed stocks with response to acid removal, V.I., color, and demulsibility, affects the reduction in the carbon residue, resins and oxygenated compounds. In addition to this, decrease in corrosion in the phenol extraction operation, which may follow the hydrogenation treatment and economies in the finished clay contacting, are made possible. From the experiments it is seen that the acid numbers of lubricating oil fractions were reduced to substantially 0, without materially affecting the sulfur content, by treatment with the molybdena-containing catalysts. Compare, for example, the original properties of charge No. 7 and the results obtained in Run 19 of Table III. The preferred conditions for this operation are: LVHSV 1.1 to 1.4, pressure 250 p.s.i.g., temperature 500 to 600° F. and using a hydrogen rate of 2000 to 2500 s.c.f./bbl. These conditions are based on the lubricating oil distillate charge. In treating a deasphalted oil, space velocities of about 1.5 are recommended with temperatures at 575 to 600° F. By conducting the regeneration in accordance with the inven-

TABLE III

*Hydrogenating activity of molybdenum oxide catalyst for acid number reduction*

| Run No. | Charge No. 7 | 18 | 19 | 20 | 21 | 22 | 23 | 24 | 25 | 26 | 27[1] | 28 |
|---|---|---|---|---|---|---|---|---|---|---|---|---|
| Catalyst—Comp. (weight percent): | | | | | | | | | | | | |
| $MoO_3$ | | 9 | | | 9 | | | | 3 | | 7.5 | 10 |
| $SiO_2$ | | 1 | | | -- | | | | 5 }97 | | ------ | 72 |
| $Al_2O_3$ | | 90 | | | 91 | | | | 95 | | 92.5 | 18.5 }90 |
| Other | | Trace | | | Trace | | | | Trace | | Trace | 4.3 MgO |
| Operating conditions: | | | | | | | | | | | | |
| Temperature, ° F. | ------ | 555 | 549 | 576 | 553 | 550 | 559 | 562 | 554 | 569 | 560 | 600 |
| Pressure, p.s.i.g. | ------ | 500 | 250 | 100 | 500 | 250 | 250 | 250 | 500 | 250 | 250 | 250 |
| LVHSV | ------ | 1.47 | 1.5 | 1.0 | 1.48 | 1.47 | 1.45 | 0.9 | 1.51 | 1.4 | 1.0 | 1.2 |
| $H_2$ rate, s.c.f./bbl. | ------ | 2,370 | 2,200 | 2,700 | 2,500 | 2,510 | 2,500 | 2,800 | 2,440 | 2,500 | 2,700 | 3,100 |
| Product inspection: | | | | | | | | | | | | |
| Color NPA | 4 | 2+ | 2 | ------ | 4+ | ------ | ------ | +3−3+ | +2 | ------ | ------ | ------ |
| API | 24.2 | 24.7 | 24.4 | 24.3 | 24.6 | 24.7 | 24.7 | 24.2 | 24.7 | 24.5 | 24.2 | 24.9 |
| Mol. weight | 370 | 375 | ------ | ------ | 345 | 370 | ------ | ------ | 365 | ------ | ------ | ------ |
| Vis. SUS at 100° F. | 241.3 | 214.5 | 230 | 228.2 | 227 | 228 | 229.9 | 227.1 | 219 | 228.3 | 241.6 | 225.9 |
| Vis. SUS at 210° F. | 47.4 | 46.2 | 46.8 | 46.8 | 47.0 | 47.0 | 46.8 | 46.6 | 46.3 | 46.7 | 47.4 | 46.6 |
| VI | 76 | 81 | 78 | 78 | 78 | 78 | 76 | 76 | 78 | 77 | 77 | 77 |
| 1948 N.N. (after 2 hours) | 3.03 | <0.03 | <0.03 | 0.05 | 0.04 | 0.04 | <0.03 | <0.03 | <0.03 | <0.03 | 0.2 | 0.05 |
| 1948 N.N. (after 12 hours) | ------ | ------ | <0.03 | 0.06 | ------ | ------ | 0.24 | <0.03 | ------ | 0.04 | 1.1 | 0.06 |
| Total sulfur weight percent | 1.13 | 1.1 | 1.10 | 1.12 | 1.18 | 1.10 | 1.14 | 1.12 | 1.2 | 1.15 | 1.13 | ------ |
| Length of run (hrs) | ------ | 3 | >12 | >12 | 2 | 4 | 12 | 25 | 2 | 17 | 5 | 25 |

[1] All catalysts were preheated at >500° F. for 1 hour with hydrogen purge except in run No. 27 which had no $H_2$ pretreatment.

TABLE IV

*Hydrogenation charge oils*

| No. | Description | SUS viscosity at— | | VI | Neut. number | °API | Total sulfur, weight percent | Conradson C.R., weight percent | Flash, °/F. |
|---|---|---|---|---|---|---|---|---|---|
| | | 100° F. | 210 °F. | | | | | | |
| 1 | Heavy deasphalted oil | 2,900 | 165.6 | 96 | 0.80 | 22.9 | | 1.87 | |
| 2 | Medium 170 distillate | 243.2 | 47.4 | 74 | 2.9 | 24.2 | 1.13 | 0.11 | 425 |
| 3 | do | 242.1 | 47.4 | 76 | 2.9 | 24.0 | 1.13 | 0.05 | 415 |
| 4 | Heavy deasphalted oil | 3,200 | 170.7 | 93 | 0.85 | 21.5 | 1.10 | 2.0 | |
| 5 | Medium 170 distillate | 243.8 | 47.5 | 75 | 3.03 | 21.3 | 1.15 | 0.07 | 415 |
| 6 | Heavy deasphalted oil | | 181 | 87 | 1.6 | 21.6 | 1.23 | 2.23 | 570 |
| 7 | Neutral distillate | 241.3 | 47.4 | 76 | 3.03 | 24.2 | 1.13 | | |
| 8 | Heavy deasphalted residuum | | 177.2 | | 1.51 | 21.7 | 1.14 | 1.96 | 570 |
| 9 | do | | 175.8 | | 1.64 | | 1.23 | 2.0 | 570 |
| 10 | Solvent refined neutral dist | | 37.5 | 90 | 0.15 | 34.0 | 0.12 | 0.01 | 370 |
| 11 | do | 200 | 46.0 | 90 | 0.30 | 28.5 | 0.45 | 0.02 | 420 |
| 12 | do | 800 | | 90 | 0.35 | 27.0 | 0.60 | 0.25 | 480 |
| 13 | Solvent refined bright stock | 2,400 | 153.0 | 100 | 0.25 | 26.5 | 0.45 | 0.60 | 580 |
| 14 | do | 3,300 | 170.0 | 90 | 0.45 | 24.3 | 0.75 | 1.2 | 580 |

tion, a catalyst life of about 3200 bbls. of lubricating oil charge per ton of catalyst is obtained, while maintaining the original catalyst activity throughout the reaction.

It is apparent that the time employed for the steps of the process are subject to some variation depending on the condition of the catalylst, the time cycle of on-stream and off-stream operation established for most efficient processing and other considerations known to the art. Thus, the experiments demonstrate that purging with a dry gas at 800° F. for 45 minutes up to 1½ hours is insufficient to bring about the highest activity and the longest catalyst life. Also, use of temperatures below about 750° F. and as much as 120 hours' time is ineffective. The minimum time and temperature for the purging step is about 800° F. for about 3 hours under average conditions of use and preferably 800–950 ° F. for at least 3 hours' time. The time required for sufficient purging to remove water present is dependent upon such factors as amount of water present, catalyst, catalyst-bed dimensions, etc.

What is claimed is:

1. The method of treating sulfur-containing lubricating oils without substantially reducing said sulfur content which comprises, subjecting a lubricating oil to hydrogenation in the presence of a molybdenum oxide-containing catalyst at a temperature of between about 450° F. to 650° F. in a reaction zone, separating the reaction products from said reaction zone, recovering a refined lubricating oil from said reaction products charactertized by its reduced neutralization number, regenerating the catalyst in said reaction zone by treatment with an oxidizing atmosphere containing water vapor at a temperature of about 900° to 1150° F. for a time sufficient to convert a substantial portion of the molybdenum oxide content of said catalyst to a higher oxidized state, terminating said regeneration, purging said catalyst with a substantially moisture-free, gaseous medium at a temperature of between about 750° to 1200° F. for a time sufficient to remove substantially all of the water present in and on said catalyst, cooling said catalyst to reaction temperature without allowing contact of same with water at temperatures above about 700° F., and continuing said hydrogenation reaction in the presence of at least a portion of said regenerated catalyst.

2. The method in accordance with claim 1 in which said lubricating oil is a solvent-refined, dewaxed, lubricating oil fraction.

3. The method in accordance with claim 1 in which said lubricating oil is a deasphalted residuum oil.

4. The method in accordance with claim 1 in which said lubricating oil is a neutral distillate.

5. The method in accordance with claim 4 in which said neutral distillate has the following physical properties:

| | |
|---|---|
| ° API | 24.2 |
| Vis., SUS, @ 100° F. | 241.3 |
| Vis., SUS, @ 210° F. | 47.4 |
| V. I. | 76 |
| 1948 neut. No. | 3.03 |
| Sulfur, wt. percent | 1.13 |

before treatment, and a product exhibiting the following physical properties is obtained:

| | |
|---|---|
| ° API | 24.1 |
| Vis., SUS, @ 100° F. | 230.0 |
| Vis., SUS, @ 210° F. | 46.8 |
| V. I. | 78 |
| 1948 neut. No. | <0.03 |
| Sulfur, wt. percent | 1.12 |

6. The process for regenerating a deactivated molybdenum oxide-containing catalyst for use in hydrogenating refined lubricating oils and fractions thereof at temperatures below about 700° F. whereby said lubricating oils and fractions are reacted with hydrogen for the purpose of reducing the neutralization number without affecting the content of naturally-occurring oxidation-inhibiting sulfur compounds which comprises subjecting said deactivated catalyst to oxidative regeneration under conditions to reactivate same and transform said molybdenum oxide to a higher oxide state, terminating said oxidative regeneration, subjecting the oxidized and regenerated catalyst to purging with a substantially anhydrous non-oxidizing atmosphere at a temperature between about 750°–1200° F. for a time sufficient to dehydrate said catalyst and cooling the dehydrated catalyst to said reaction temperature under anhydrous conditions.

References Cited in the file of this patent

UNITED STATES PATENTS

| | | |
|---|---|---|
| 2,339,717 | Oberfell | Jan. 18, 1944 |
| 2,749,287 | Kirshenbaum | June 5, 1956 |
| 2,799,626 | Johnson et al. | July 16, 1957 |
| 2,865,839 | Halter et al. | Dec. 23, 1958 |
| 2,877,174 | Mattox | Mar. 10, 1959 |